United States Patent
Parziale et al.

(10) Patent No.: US 11,480,231 B2
(45) Date of Patent: Oct. 25, 2022

(54) TRANSMISSION BELT AND ASSOCIATED TRANSMISSION SYSTEM

(71) Applicant: DAYCO EUROPE S.R.L., Chieti (IT)

(72) Inventors: Domenico Parziale, Chieti (IT); Marino Petaccia, Chieti (IT); Fabrizio Breggia, Chieti (IT); Marco Di Meco, Chieti (IT)

(73) Assignee: Dayco Europe S.R.L., Chieti (IT)

( * ) Notice: Subject to any disclaimer, the term of this patent is extended or adjusted under 35 U.S.C. 154(b) by 248 days.

(21) Appl. No.: 16/996,121

(22) Filed: Aug. 18, 2020

(65) Prior Publication Data

US 2020/0378470 A1 Dec. 3, 2020

Related U.S. Application Data

(63) Continuation of application No. 15/307,925, filed as application No. PCT/IB2014/061164 on May 2, 2015, now abandoned.

(51) Int. Cl.
| | |
|---|---|
| *F16G 1/28* | (2006.01) |
| *F16G 1/12* | (2006.01) |
| *F16H 57/04* | (2010.01) |
| *F16H 7/02* | (2006.01) |
| *F16G 1/10* | (2006.01) |

(52) U.S. Cl.
CPC ............... *F16G 1/28* (2013.01); *F16G 1/10* (2013.01); *F16G 1/12* (2013.01); *F16H 7/023* (2013.01); *F16H 57/0489* (2013.01)

(58) Field of Classification Search
CPC ..... F16G 1/28; F16G 5/20; F16G 1/10; F16G 5/08

USPC ......................................................... 474/205
See application file for complete search history.

(56) References Cited

U.S. PATENT DOCUMENTS

| | | | | | |
|---|---|---|---|---|---|
| 3,535,946 | A | * | 10/1970 | Miller | F16G 1/28 474/263 |
| 3,989,580 | A | * | 11/1976 | Hoback | B29D 29/08 156/499 |
| 4,042,443 | A | * | 8/1977 | Hoback | B29D 29/08 428/161 |
| 5,242,743 | A | * | 9/1993 | Nakanishi | D04C 1/12 87/10 |

(Continued)

FOREIGN PATENT DOCUMENTS

| | | |
|---|---|---|
| EP | 0050011 A1 | 4/1982 |
| EP | 0649995 A1 | 4/1995 |

(Continued)

OTHER PUBLICATIONS

PCT, International Search Report and Written Opinion, International Application No. PCT/IB2014/061164, 12 pages, dated Feb. 13, 2015.

*Primary Examiner* — Henry Y Liu
(74) *Attorney, Agent, or Firm* — FisherBroyles, LLP; Susan M. Oiler

(57) ABSTRACT

A transmission belt is provided which has a first elastomeric material, a plurality of longitudinal inserts comprising a first material, a working surface covered by a covering including a second material, and an opposite surface to said working surface. At least one of the first material and the second material is a fibrous metallic material. Advantageously, the transmission belt is a toothed belt.

16 Claims, 3 Drawing Sheets

(56) References Cited

U.S. PATENT DOCUMENTS

| | | | | |
|---|---|---|---|---|
| 5,268,221 A * | 12/1993 | Nakanishi | ............... | D02G 3/447 474/260 |
| 5,346,731 A * | 9/1994 | Nakanishi | ................. | F16G 1/08 87/8 |
| 5,529,545 A * | 6/1996 | Isshiki | ....................... | F16G 1/28 474/267 |
| 5,860,883 A * | 1/1999 | Jonen | ..................... | C08K 5/098 474/271 |
| 6,117,035 A * | 9/2000 | Isshiki | ....................... | F16G 1/28 474/260 |
| 6,406,397 B1 * | 6/2002 | Isshiki | ....................... | F16G 1/28 474/263 |
| 6,485,386 B2 * | 11/2002 | Yuan | ..................... | B29D 29/08 474/205 |
| 6,605,014 B2 * | 8/2003 | Isshiki | ....................... | F16G 1/28 474/263 |
| 6,770,004 B1 * | 8/2004 | Lofgren | .................... | F16G 1/00 474/264 |
| 7,909,720 B2 * | 3/2011 | Burrowes | ............... | B32B 9/045 474/271 |
| 8,057,344 B2 * | 11/2011 | Wu | .......................... | F16G 5/08 474/260 |
| 8,070,634 B2 * | 12/2011 | Gaynor | ................. | F16H 55/171 474/205 |
| 8,357,065 B2 | 1/2013 | Duke, Jr. | | |
| 2007/0191163 A1 * | 8/2007 | Kanzow | .................... | F16G 1/28 474/205 |
| 2007/0244263 A1 * | 10/2007 | Burrowes | ............... | F16G 5/166 474/271 |
| 2008/0004145 A1 * | 1/2008 | Duke | ........................ | F16G 1/28 474/205 |
| 2010/0197435 A1 * | 8/2010 | Gewald | ..................... | F16G 1/28 474/263 |
| 2010/0255259 A1 * | 10/2010 | Baldovino | ................ | B32B 3/30 524/565 |
| 2011/0263367 A1 * | 10/2011 | Baldovino | ................ | F16G 1/28 474/204 |
| 2011/0269589 A1 * | 11/2011 | Schleicher | ................ | F16G 1/28 474/205 |
| 2015/0285334 A1 * | 10/2015 | Thomas | .................... | F16G 1/10 474/90 |
| 2019/0011016 A1 * | 1/2019 | Yoshida | ................. | B32B 25/10 |

FOREIGN PATENT DOCUMENTS

| | | |
|---|---|---|
| EP | 202597 A1 | 2/2009 |
| WO | 2006035463 | 4/2006 |

\* cited by examiner

TRANSMISSION BELT AND ASSOCIATED TRANSMISSION SYSTEM

CROSS-REFERENCE TO RELATED APPLICATIONS

This application is a continuation of U.S. application Ser. No. 15/307,925, filed Oct. 31, 2016, which was the National Stage of International Application No. PCT/IB2014/061164, filed May 2, 2014.

TECHNICAL FIELD

The present invention relates to a transmission belt comprising a fibrous material covering the working surface that includes metallic fibres. In a preferred embodiment, the transmission belt is a toothed belt.

PRIOR ART

Transmission belts, and especially toothed belts, generally comprise a body made of an elastomeric material, in which a plurality of longitudinal thread-like durable inserts, also known hereinafter as cords or simply inserts, is buried and a working surface that, in use, transmits the driving force.

Each component of the belt contributes to increase the performance in terms of mechanical resistance, in order to decrease the risk of the belt breaking and to increase the specific transmissible power.

In particular, the cords contribute to ensure the required mechanical characteristics of the belt and make an essential contribution to determine the modulus of the belt and, in particular, to ensure stable performance over time. The cords are generally obtained by twisting high-modulus fibres several times.

The cords or inserts are normally treated with suitable compounds to increase the compatibility of the fibres with the body compound surrounding the cords.

It is known that cords are manufactured in many materials based on different fibres, such as, purely by way of example, carbon, aramid, PBO and glass.

The body compound enables connecting the various elements and ensures that they contribute to the final performance of the belt in a synergetic manner.

Body compounds are based on one or more elastomeric materials, possibly enriched with fibres to increase hardness.

Lastly, the transmission belts have a working surface generally covered by a fibrous material, for example a covering fabric on the belts, which has the task of increasing abrasion resistance and thus protects the working surface of the belt from wear due to rubbing between the sides and the slopes of the teeth of the belt and the sides and the throats of the grooves of the pulley with which the belt interacts.

In addition, the fibrous covering material reduces the coefficient of friction of the working surface, reduces the deformability of the teeth and, most of all, reinforces the root of the tooth, thereby avoiding its breakage.

However, in recent engines where performance has increased significantly, toothed belts are subjected to high temperatures and these temperatures result in quicker deterioration of the materials forming the various components of the belts.

Furthermore, the belts are often used "in oil", or rather in systems in which the belt is inside the crankcase and therefore in direct contact with oil spray, or even works partially immersed in an oil bath. In particular, the materials of transmission belts used "dry", designed to resist oil only for a short time and at low temperatures, are unable to prevent deterioration of the mechanical characteristics at high temperatures and can therefore give rise to teeth breaking and consequently shorten the mean life of the belt.

To avoid these problems, it is currently known to use covering fabrics, especially for toothed belts, for example with a structure constituted by woven yarns, or rather yarns that extend, in use, in a longitudinal direction of the belt, including fibres of polyamide or with a composite structure, each formed by an elastic yarn as the core and a pair of composite yarns wound around the elastic yarn. Each composite yarn comprises a yarn of high thermal and mechanical resistance and at least one covering yarn wound around the yarn of high thermal and mechanical resistance. The elastic yarn could be made, for example, of polyurethane. The yarn of high thermal and mechanical resistance could be made, for example, of para-aromatic polyamide. The covering yarn is made of an aliphatic polyamide, in particular nylon 66.

However, this solution is disadvantageous as it easily deteriorates and causes quite a few belt breakages, in particular in high-temperature conditions and in systems where the belt works continuously in contact with oil.

Alternative materials are therefore being sought for the production of a covering for transmission belts, in particular toothed belts, which enables improving the mechanical and wear resistance characteristics of known fabrics.

In addition, in the last few years, more stringent emission regulations have resulted in designing engines that reach increasingly higher temperatures in the engine compartment when running.

The materials currently used for making the coverings comprise simple yarns in nylon 66. However, the behaviour of these yarns is not optimal at high temperatures, whether the belts are used dry or in air, and even more so when used in systems in oil and therefore inside the engine crankcase.

Covering fabrics are therefore sought that are resistant to the high temperatures of current-day engines, whether dry or in oil.

In the end, whether used dry or in oil or inside the engine crankcase, belts are subjected to attack by numerous chemical agents. In systems where the belt is used in direct contact or partially immersed in oil, the engine oil often contains pollutants such as ethanol, petrol and diesel fuel, and combustion residues. In particular, pollution from petrol that mixes with the oil, even in quite high percentages, diluting the oil and attacking the materials constituting the belt, is harmful.

For example, in some applications, the oil can contain up to 30% fuel. The percentage of fuel is variable, depending on the running conditions of the engine, and increases with high load and low engine temperature.

In addition, the modern, so-called green fuels are particularly aggressive as they contain numerous additives that attack the polyamide yarns of the fabric.

Covering fabrics are therefore sought that are resistant to chemical agents, especially at the high running temperatures of the engines in use today with peaks of roughly 150° C. and up to around 170° C.

Producing coverings for conveyor belts comprising metal is already known.

However, the known coverings in steel are made with single steel wires of a diameter well above 50 micron, in both weft and warp, and are extremely rigid. These thick wires are therefore suitable for being used as sheathing for products that must not flex or only flex very slightly.

These fabrics are therefore not used in transmission belts, especially in toothed transmission belts.

Using durable inserts made of aramid fibres, for example those marketed with the Kevlar® or Twaron® trademarks, in belts for high performance in terms of transmissible power is also known.

However, as has long been known, aramid fibres have the drawback of very low dimensional stability over time, and so a belt with durable inserts in aramid fibres undergoes a shortening of its length during storage, with consequent alteration (reduction) of the initial pitch; it is therefore subjected to higher loads and stress during use, which normally result in premature wear triggered by the meshing error created between belt and pulley. Moreover, durable inserts made of aramid fibres require a particularly complex and expensive adhesion enhancement treatment to improve the long-term dimensional stability of the durable insert, which if not carried out accurately can also entail problems in the step of cutting the belts.

Alternatively, producing inserts in glass is also known, although this is a fragile material and therefore not particularly resistant to bending.

In the past, durable steel inserts have been produced by twisting several wires, each having a diameter of more than 50 micron and with high long-term dimensional stability, but having a high specific weight and, in addition, because the depositing of the reinforcement element takes place in a helical manner, these durable elements partially stick out from the side edges of the belts during the belt cutting step, with the risk of injury to operators when fitting the belt.

To avoid this risk it is therefore necessary to proceed with a further finishing step, which contemplates the removal of the cord strands that stick out due to the cut and the manual sealing of all the edges of the belt with adhesive in the areas where the strands partially stuck out. This extra finishing step entails significant additional costs, as it is carried out by hand and must be carried out of every single belt.

Finally, the flexural strength, i.e. the capacity to support the bending of these steel wires, is particularly modest, for example, with respect to glass. For this reason, they are no longer used nowadays.

SUBJECT OF THE INVENTION

A first object of the present invention is to obtain a transmission belt comprising a fibrous covering material that covers the working surface and which has a simple structure and is resistant to high temperatures, whether dry or in oil.

A second object of the present invention is also to obtain a transmission belt that comprises a fibrous covering material that is resistant to chemical agents, especially the impurities present in engine oil.

A third object of the present invention is to obtain a toothed transmission belt having an extremely high modulus and very high long-term stability and that, at the same time, avoids the above-described problems regarding known durable inserts.

A further object of the present invention is to obtain a transmission belt that has a long service life, and which therefore has excellent mechanical and meshing precision characteristics.

In accordance with the present invention, these objects are achieved by a transmission belt having a body that includes a first elastomeric material, a plurality of longitudinal inserts comprising a first material, a working surface covered by a covering comprising a second material, and an opposite surface to said working surface. Here, at least one of the first material and the second material is a fibrous metallic material having fibres with a diameter of between 2 and 40 μm.

In accordance with the present invention, a transmission system having a transmission belt as disclosed herein is also provided. In the transmission system, the transmission belt is at least partially in an oil bath or continuously in contact with oil.

BRIEF DESCRIPTION OF DRAWINGS

For a better understanding of the present invention, it will now be described with reference to the attached figures, in which.

DESCRIPTION OF INVENTION

Figure 1:
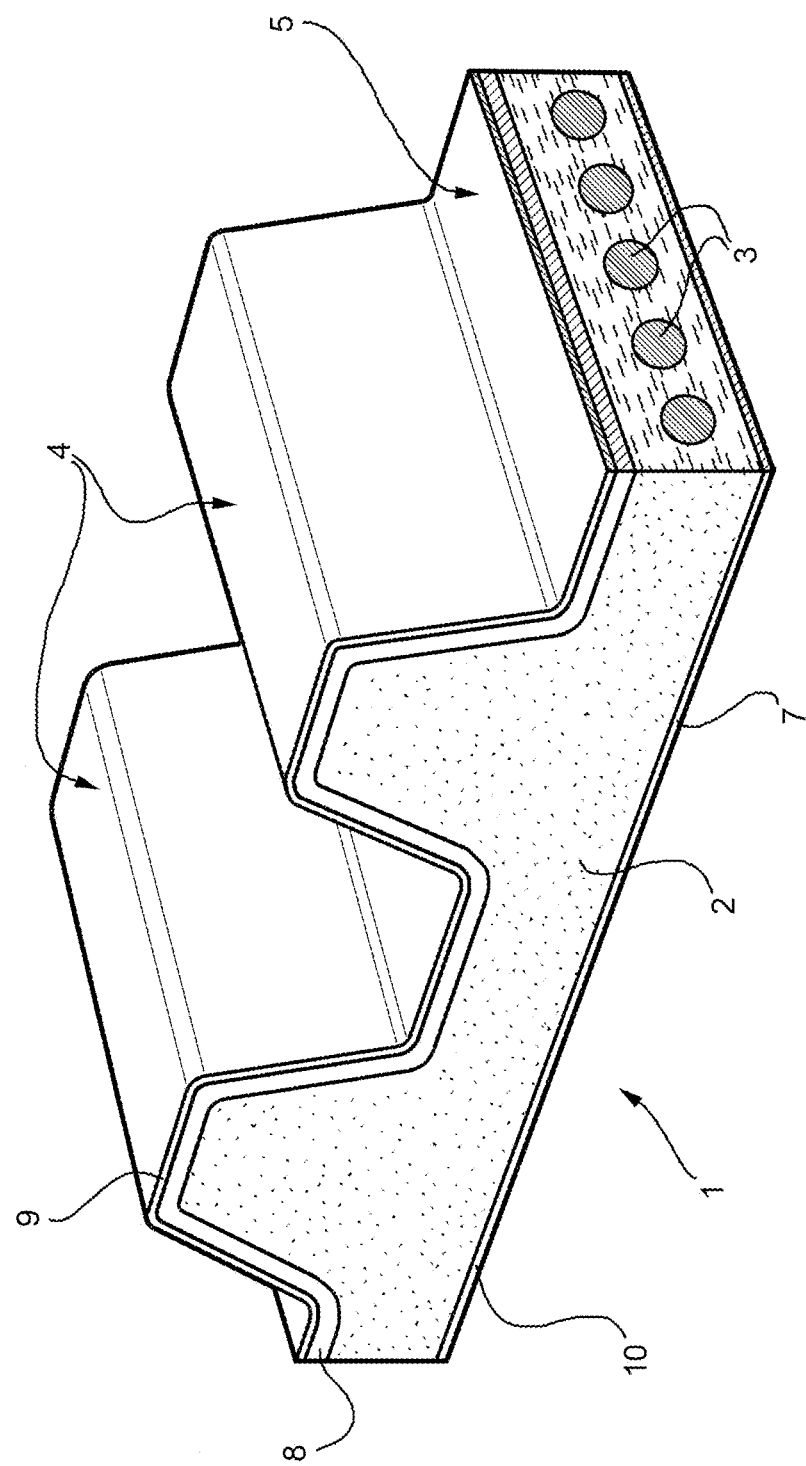
FIG. 1 is a partial perspective view of a toothed belt according to the present invention.

FIG. 1 shows a toothed belt, indicated as a whole by reference numeral 1. The belt 1 comprises a body 2, including a first elastomeric material in which a plurality of longitudinal thread-like durable inserts 3 is buried, and toothing 4 composed of a plurality of teeth that, in use, constitute the working surface 5, or rather the surface that meshes with a corresponding pulley of the transmission system.

The toothed belt also comprises a back 7 opposite to the working surface 5.

Preferably, the body 2 is made of a compound comprising one or more elastomeric materials and numerous additives. For convenience, the elastomeric material(s) is/are hereinafter indicated altogether as the "first elastomeric material".

The body of the belt advantageously comprises an elastomer as the main elastomer in the first elastomeric material that is chosen from the group constituted by natural rubber (NR), polychloroprene (CR), acrylonitrile butadiene (NBR) and associated hydrogenated elastomers known as hydrogenated acrylonitrile butadiene (HNBR) or zinc salts of hydrogenated acrylonitrile butadiene seamed with esters of unsaturated carboxylic acid, polyisoprene, styrene-butadiene rubbers, ethylene-alpha-olefin elastomers, EPDM, polyurethane, fluoroelastomers, ethylene-acrylic elastomers (AEM), bromobutyls, chlorosulphonated polythene (CSM) or chlorosulphonated alkyl, chlorinated polythene, epoxidized natural rubber, SBR, NBR carboxylates, HNBR carboxylates, ACM and mixtures of these compounds.

The "main elastomer" is intended as being present in the compound that constitutes the body for more than 50% by weight, calculated on the total weight of all the elastomers in the compound and therefore excluding all other non-elastomeric components of the belt.

The body preferably comprises at least one copolymer of polyolefin or a rubber containing acrylonitrile units as the first or a further elastomeric material.

More advantageously, the copolymer(s) used as body compounds are nitrile rubbers, advantageously acrylonitrile butadiene rubbers, known as NBR. Even more advantageously, they are hydrogenated acrylonitrile butadiene, or HNBR, or even XHNBR, i.e. hydrogenated and carboxylated acrylonitrile butadiene.

Advantageously, the HNBR used for making the transmission systems in which the belt is partially in an oil bath or in direct contact with oil and impurities has a high level of hydrogenation, for example so-called completely saturated HNBRs can be used, these having a percentage of residual double bonds of 0.9% at most, but HNBRs with a lower level of unsaturation can also be used in alternative, such as, for example, so-called partially saturated HNBRs having a saturation level of 4% or 5.5%.

Some examples of HNBR copolymers that can be used in the body compound, but also in the different treatments of the various elements forming the toothed belt, include copolymers belonging to the THERBAN® family made by Lanxess, such as THERBAN® 3407 with 34% nitrile groups and a hydrogenation level of 0.9% at most, THERBAN® 3406 with 34% nitrile groups and an unsaturation level of 0.9% at most, THERBAN® 3607 with 36% nitrile groups and an unsaturation level of 0.9% at most, THERBAN® 3446 with 34% nitrile groups and an unsaturation level of 4% at most, THERBAN® 3447 with 34% nitrile groups and an unsaturation level of 5.5% at most, THERBAN® 3627 with 36% nitrile groups and an unsaturation level of 2% at most, THERBAN® 3629 with 36% nitrile groups and an unsaturation level of 2% at most, and THERBAN® 3907 with 39% nitrile groups and an unsaturation level of 0.9% at most.

Alternatively, it is also possible to use HNBRs made by Nippon Zeon with the name ZETPOL®. In particular, ZETPOL® 2000 with 36% nitrile groups and an unsaturation level of 0.9% at most, ZETPOL® 2000L with 36% nitrile groups and an unsaturation level of 0.9% at most, ZETPOL® 2010 with 36% nitrile groups and an unsaturation level of 4% at most, ZETPOL® 2010L with 36% nitrile groups and an unsaturation level of 4% at most, ZETPOL® 2010H with 36% nitrile groups and an unsaturation level of 4% at most, ZETPOL® 2020 with 36% nitrile groups and an unsaturation level of 5.5% at most, and ZETPOL® 2020L with 36% nitrile groups and an unsaturation level of 5.5% at most.

More advantageously, the acrylonitrile units in the elastomer for applications in oil are between 33% and 51%, for example 50% by weight, while for dry applications they are between 15% and 25% by weight, for example 21% by weight.

Even more advantageously, a polymer formed by a mixture of one or more copolymers, obtained starting from a diene monomer and a monomer containing nitrile groups where an acid or salt of an unsaturated carboxylic acid is added to one or more of these copolymers, is used in combination with a first polymer. More advantageously, the unsaturated carboxylic acid is methacrylic or acrylic acid and said salt is a zinc salt of methacrylic or acrylic acid. Even more advantageously, a zinc salt of methacrylic acid is used. Even more advantageously, the zinc salt of methacrylic acid is added in a quantity in the range between 10 and 60 phr.

For example, the elastomers sold by Zeon under the following names can be used advantageously: ZSC 1295, ZSC 2095, ZSC 2195, ZSC 2295, ZSC 2295L, ZSC 2295R and ZSC 2395.

In particular, it is possible to partially or entirely replace the previously mentioned HNBRs, namely ZETPOL® and/or THERBAN® with a ZSC that comprises an unsaturated carboxylic acid and zinc oxide and/or with THERBAN® ART that comprises an unsaturated carboxylic acid salt.

Mixed compounds of polyolefin and rubber containing acrylonitrile units are also preferred, more preferably compounds containing a copolymer of ethylene with NBRs or HNBRs or the above-mentioned modified HNBRs. For example, rubbers containing EPDM (ethylene-propylene diene monomer) or EPM (ethylene-propylene monomer) can be added to polymers containing acrylonitrile units in quantities preferably in the range between 1% and 30%.

In addition to the elastomeric materials, the body compound can comprise conventional additives such as, for example, reinforcement agents, extenders, pigments, stearic acid, accelerators, vulcanization agents, antioxidants, activators, initiators, plasticizers, waxes, prevulcanization inhibitors, antidegradants, process oils and similar.

Advantageously, carbon black can be employed as an extender, being advantageously added in quantities in the range between 0 and 80 phr, more advantageously about 40 phr. Advantageously, light-coloured reinforcing extenders such as talc, calcium carbonate, silica and silicates are added in quantities advantageously in the range between 0 and 80 phr, advantageously about 40 phr. It is also possible to advantageously use silanes in quantities in the range between 0 and 5 phr.

Advantageously, zinc and magnesium oxides are added in a quantity ranging between 0 and 15 phr.

Advantageously, ester plasticizers such as trimellitates or ethyl esters are added in a quantity advantageously ranging between 0 and 20 phr.

Advantageously, vulcanization coagents such as triallyl cyanurates and organic or inorganic methacrylates such as metal salts are advantageously added in a quantity ranging between 0 and 20 phr, or organic peroxides, such as isopropyl benzene peroxide for example, in a quantity advantageously ranging between 0 and 15 phr.

It is understood that use "in-oil" means that the belt is used partially immersed in an oil bath or in direct contact with oil. In general, in use, the belt can be inside the engine crankcase, for example, as an alternative to chain or gear systems.

It is understood that "dry" use means that the belts are outside the engine crankcase and are only accidentally in contact with engine oil and not generally in contact with oil mixed with petrol.

It is understood that use "in oil mixed with petrol" means that the toothed belt is used in a mixture of oil with percentages of petrol even exceeding 30%.

In the following, reference will be made to an example of producing the transmission belt of the present invention with reference to a toothed belt, but it is obvious that the transmission belt could also be a multi-groove belt or so-called poly-V belt.

In one aspect of the present invention, the transmission belt comprises inserts 3, also known as cords or durable inserts, arranged in a longitudinal direction and including a fibrous metallic material.

It is understood that fibrous metallic material means a material including metallic fibres.

It is understood that metallic fibres means composite fibres not only just of metal, but also metal covered by polymeric material or fibres of a polymeric material covered by metal.

In another aspect of the present invention, the working surface 5 of the transmission belt is covered with a covering 8 including a fibrous metallic material.

It is understood that working surface means the face of the belt that, in use, meshes with the pulley and via which the drive is transmitted. Clearly, the working surface can comprise one or more coverings and subsequent treatments that all contribute to the belt's performance and only one of them will be effectively on the outside and in contact with the pulley.

Advantageously, the transmission belt comprises both inserts 3 and the covering 8 including a fibrous metallic material.

Advantageously, the fibrous metallic material is based on fibres having a diameter of between 2 and 40 μm.

More advantageously, the fibrous metallic material is based on fibres having a diameter of between 5 and 15 μm.

More advantageously, the fibrous metallic material is steel, even more advantageously stainless steel.

For example, the fibrous metallic material could be a material chosen from those sold under the Naslon registered trademark.

Advantageously, the fibrous metallic material comprises filaments including fibres, more advantageously it comprises yarns including filaments including metallic fibres.

Advantageously, the fibrous metallic material comprises complex or hybrid yarns composed of several fibrous materials.

Advantageously, the covering 8 of the working surface 5 is chosen from the group constituted by woven fabric, knitted fabric and non-woven fabric.

In the case where a woven fabric or a knitted fabric is used, the fabric yarns include the fibrous metallic material.

More advantageously, the fibrous metallic material is a fabric.

Advantageously, the fibrous metallic material has a weight of between 500 and 1500 g/m2.

More advantageously, the fabric comprises yarns that extend substantially in the longitudinal direction of the toothed belt. As a rule, these longitudinal yarns are weft yarns.

In the case where the transmission belt is a toothed belt, the longitudinal yarns including the fibrous metallic material are substantially parallel to the inserts 3.

Advantageously, the fabric comprises longitudinal yarns and transverse yarns both including the fibrous metallic material.

Alternatively, the transverse yarns include a material chosen from the group constituted by polyamides and polyesters. More advantageously, the transverse yarns include polyamides, even more advantageously aromatic polyamides such as para-aramids or meta-aramids for example, e.g. materials sold under the Conex registered trademark.

Advantageously, the longitudinal yarns comprise composite yarns formed by at least two yarns.

More advantageously, the yarns comprise at least one elastic yarn around which at least one yarn including metallic fibres is wound.

The covering fabric 8 of the toothing 4 can be formed by one or more layers and can be obtained via different weaving techniques, for example, preferably twill weaving, even more preferably 2×2 twill weaving.

For example, in a first embodiment of the present invention, the covering fabric 8 has a structure constituted by longitudinal yarns forming the weft and transverse yarns forming the warp, in which at least the weft is constituted by yarns including metallic fibres.

Advantageously, the yarns include metallic fibres for at least 25% by weight and, even more preferably, could be made entirely of metallic fibres.

Optionally, the warp is also constituted by warp yarns including metallic fibres.

In a second embodiment of the present invention, the covering fabric 8 has a structure constituted by longitudinal yarns forming the weft and transverse yarns forming the warp, in which at least the weft has a composite structure, i.e. constituted by weft yarns each formed from an elastic yarn as the core and a pair of composite yarns wound around the elastic yarn; each composite yarn comprises a yarn of high thermal and mechanical resistance and at least one covering yarn wound around the yarn of high thermal and mechanical resistance. The elastic yarn is made, for example, of polyurethane. The yarn of high thermal and mechanical resistance is made, for example, of para-aromatic polyamide. The covering yarn is made of metallic fibres.

In a third embodiment of the present invention, the covering fabric 8 has a structure constituted by longitudinal yarns forming the weft and transverse yarns forming the warp, in which at least the weft has a composite structure, i.e. constituted by weft yarns each formed from an elastic yarn as the core around which a yarn of high thermal and mechanical resistance is wound. A covering yarn is subsequently wound on the yarn of high thermal and mechanical resistance. The elastic yarn is made, for example, of polyurethane. The yarn of high thermal and mechanical resistance is made, for example, of para-aromatic polyamide. The covering yarn is made of metallic fibres.

According to a preferred embodiment of the present invention, the woven, knitted, or non-woven covering fabric of the working surface 8 of the transmission belt 1 is treated with at least a first and/or second protection or adhesion enhancement treatment.

Advantageously, it is subjected to a first protection or adhesion treatment, for example, with RFL.

More advantageously, it is also subjected to a second protection treatment comprising a second elastomeric material different from or the same as that forming the body of the belt.

More advantageously, the second protection treatment also comprises an anti-friction material, for example, chosen from the group constituted by copper powder, molybdenum sulphide, graphite and a fluorinated homopolymer or copolymer or mixture thereof.

Even more advantageously, the anti-friction material is PTFE.

Advantageously, one or more copolymers formed from a monomer containing nitrile groups and a diene are used as the second elastomeric material.

Advantageously, the monomers containing nitrile-groups are in a percentage in the range between 15% and 60% with respect to the entirety of end copolymers.

More advantageously, they are between 15% and 25% by weight for cold applications with temperatures down to −40° C., between 33% and 39% by weight for belts with dry applications and between 39% and 51% by weight for in-oil applications.

Even more advantageously, for in-oil applications they are between 34% and 49% by weight, while for dry applications also suitable for low-temperature starting they are between 19% and 23% by weight, for example 21% by weight.

More advantageously, the copolymer(s) used are nitrile rubbers, advantageously acrylonitrile butadiene rubbers, known by the acronym NBR. Even more advantageously, they are hydrogenated acrylonitrile butadiene or HNBR, or even XHNBR, i.e. carboxylated hydrogenated acrylonitrile butadiene.

By opportunely choosing the quantities of the materials of which it is composed, the protection treatment can form a covering coating 9, distinct and separate from the fibrous material, also referred to hereinafter as the wear-resistant coating 9. The wear-resistant coating 9 constitutes the working surface of the belt and therefore further increases wear resistance and avoids oil absorption.

Advantageously, PTFE is present in the wear-resistant coating in a larger phr quantity than the second elastomeric material.

The gauge of the wear-resistant coating 9 is advantageously between 0.03 mm and 0.2 mm.

The wear-resistant coating 9 can be placed over the covering fabric 8 in different ways. Preferably, it is placed by means of a calendering step.

Preferably, to ensure the necessary resistance, the wear-resistant coating 9 weighs between 50 and 400 gr/m$^2$.

Preferably, the back 7 of the belt is also covered by a fibrous covering material, preferably the same as that previously described.

In one aspect of the present invention, the inserts 3 are formed by a plurality of filaments or yarns and each yarn is formed by a plurality of filaments.

Advantageously, each insert 3 comprises between 3 and 20 yarns.

Even more advantageously, each insert 3 comprises between 5 and 15 yarns twisted together. For example, the embodiment in which there are 11 yarns proved to be particularly preferred.

More advantageously, each yarn comprises between 50 and 500 filaments. Even more advantageously, between 100 and 300 filaments, for example 200

Even more preferable, each filament is made from metallic fibres having a diameter of between 10 and 15 micron. For example, the embodiment in which the diameter of the single fibres forming the filaments is 12 micron proved to be particularly preferred.

In an alternative preferred embodiment of the invention, the inserts 3 also comprise a second fibrous material.

The second fibrous material used for producing the inserts 3 is preferably chosen from a group composed of glass fibres, aramid fibres, polyester fibres, carbon fibres and PBO fibres.

The fibrous metallic material preferably has a higher modulus than the second material and the second material is preferably wound around the fibrous metallic material.

The second material is preferably chosen so as to solve problems of compatibility with the compound of the surrounding body.

In section, the second material preferably occupies an area of between 15% and 75% with respect to the overall surface of the section. Even more preferably, the second material occupies an area of between 45% and 55% with respect to the overall surface.

Preferably, the inserts according to the present invention have a twist of the Lang's twist type, namely they have two twists in the same direction, as this construction has been found to be particularly effective.

It is possible to vary the number of filaments or yarns that form a durable insert, as well as the number of base filaments or the count or the entire construction of the insert without departing from the present invention.

Preferably, the fibres forming the cord are treated with HNBR latex vulcanized with water-soluble peroxides by means of the procedure illustrated in patent WO2004057099 in the name of Nippon Glass.

Preferably, the treatment therefore comprises a treatment liquid, preferably an aqueous adhesive and consequently including more than 50% water, comprising elastomeric latex material and a vulcanization accelerator.

As a rule, the water portion evaporates during vulcanization and only the latex remains on the finished belt.

Preferably, the latex comprises a third elastomeric material including one or more copolymers formed from a monomer containing nitrile groups and a diene in which the monomers containing nitrile groups are in a percentage of between 30% and 39% by weight with respect to entirety of end copolymers. More preferably, the nitrile groups are in a percentage of between 30% and 32% by weight with respect to entirety of end copolymers.

A transmission belt and, in particular, a toothed transmission belt 1 according to the present invention are produced using known manufacturing processes.

The transmission belts according to the present invention are particularly suitable for being used in systems in direct contact with or partially immersed in oil, in particular engine oil at high temperatures, such as those reached in recently developed engines, for example even higher than 130°, and inside the vehicle's engine crankcase. In particular, excellent results have been achieved in the case where the belt is used as a replacement for traditional gear or chain systems, systems in which the belt is exposed for its entire working life to continuous contact with oil spray or is possibly partially immersed in an oil bath.

In this case, when a covering fabric 10 is present on the back, it is quite advantageous to carry out the adhesive treatment and/or the protection treatment on the back 7 of the transmission belt as well. In this case, the treatment enables preventing oil penetration from the back 7 of the toothed belt 1 as well, and is particularly advantageous when the toothed belt 1 is used in control systems in which the back 7 of the belt is in contact with shoes or tensioners. In fact, in these systems oil remains interposed between the contact surface of the shoe or tensioner with the belt and the back of the belt and therefore penetration inside the mixture that constitutes the body would be favoured.

Preferably, the toothed belt 1 can be treated on all the outside surfaces and, in particular, on the sides where the body mixture is most exposed to attack by oil, with a swelling resistant rubber, for example ENDURLAST (registered trademark of Lord).

Figure 2:
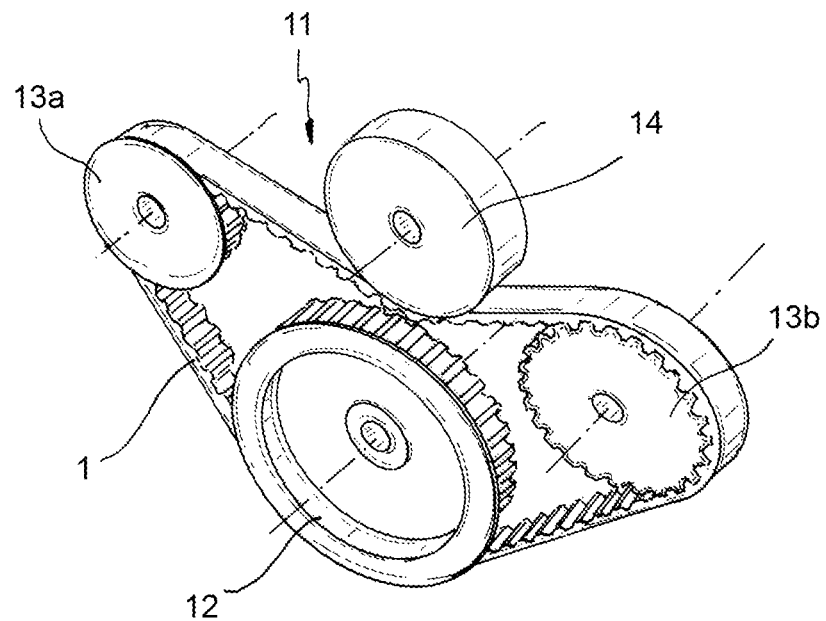
FIG. 2 is a diagram of a first timing control system using a first toothed belt according to the present invention.

The belt 1 according to the present invention is advantageously used, for example, in a timing control system for a motor vehicle of the type depicted in FIG. 2. The timing control system is indicated as a whole in the figure by reference numeral 11 and comprises a drive pulley 12 rigidly fastened to the driveshaft, not shown, a first 13*a* and a second 13*b* driven pulley and a tensioner 14 for tensioning the toothed belt.

Figure 3:
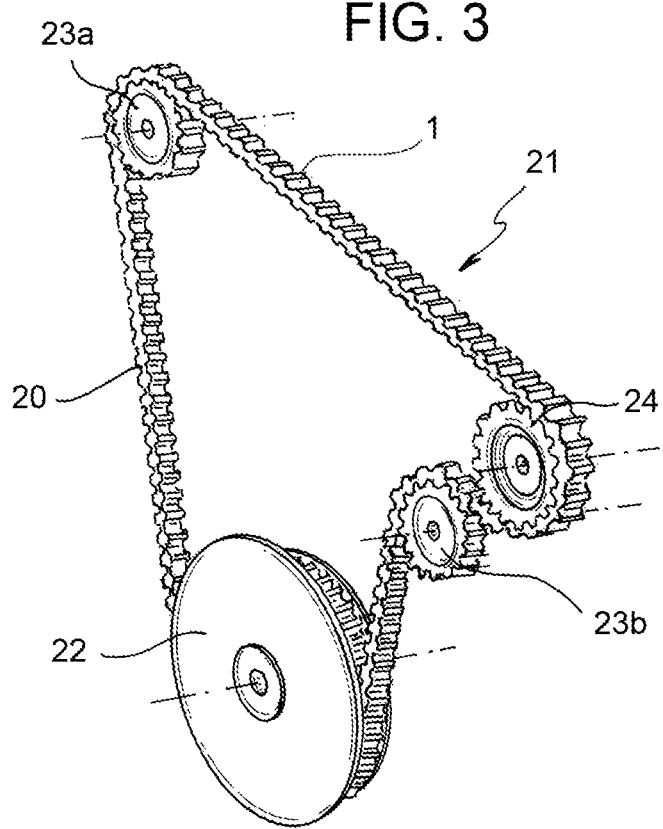
FIG. 3 is a diagram of second timing control system using a second toothed belt according to the present invention.

According to a second alternative embodiment, shown in FIG. 3, a toothed belt according to the present invention is indicated by reference numeral 1, this belt having toothing on both faces and therefore a covering 8 on one or both of the toothings.

The timing control system is indicated as a whole in the figure by reference numeral 21 and comprises a drive pulley 22 rigidly fastened to the driveshaft, not shown, a first 23*a*, a second 23*b* and a third 24 driven pulley.

Figure 4:
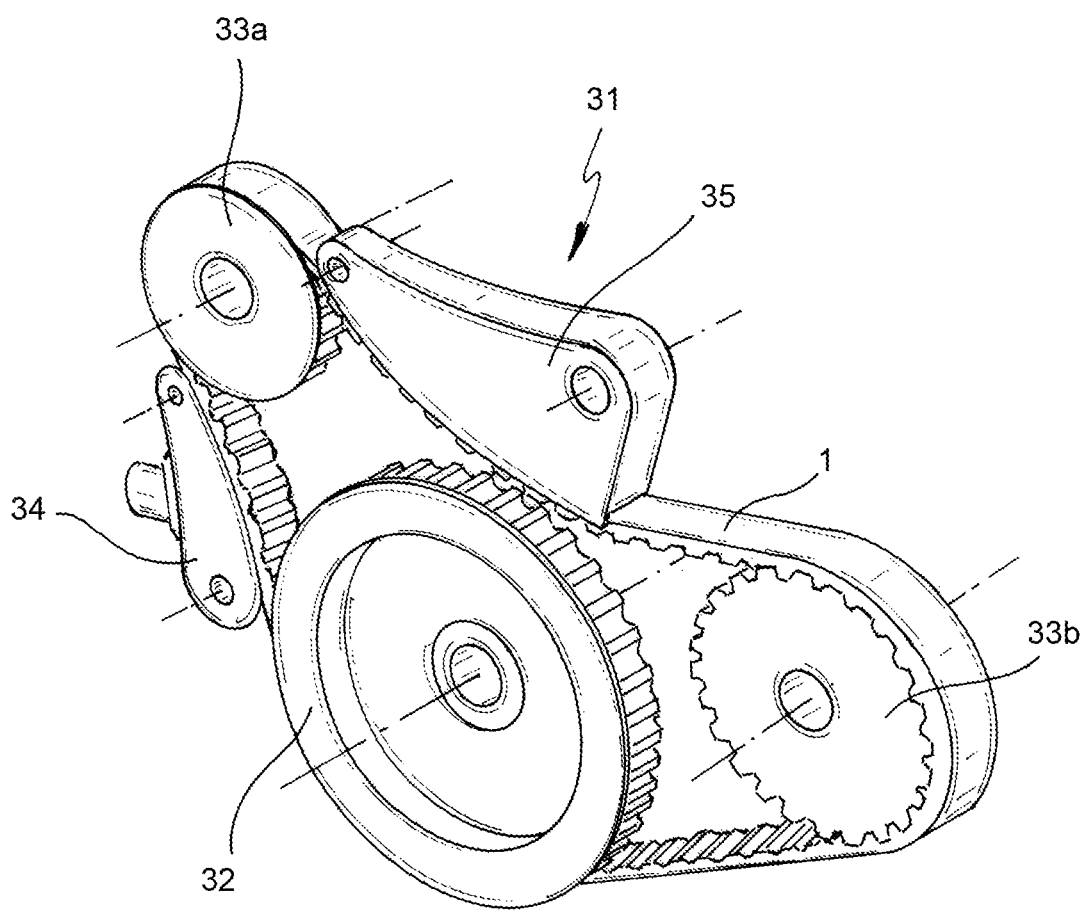
FIG. 4 is a diagram of a third timing control system using a third toothed belt according to the present invention.

According to a third embodiment of the present invention, shown in FIG. 4, a toothed belt 1 according to the present invention can advantageously be used in a timing control system indicated as a whole in the figure by reference numeral 31, which comprises a drive pulley 32 rigidly fastened to the driveshaft, not shown, a first 33*a* and a second 33*b* driven pulley, a shoe tensioner 34 and a shoe 35.

In particular, the transmission belt of the present invention has proved to be particularly effective when used in a transmission system commonly referred to as balance shafts.

In use, the toothed belts 1 in the respective control systems 11, 21 and 31 are in direct contact with oil.

FIGS. 2 to 4 refer to control systems related to the movement of balance countershafts, but it is clear that the belt according to the present invention can also be used in so-called cam-to-cam systems or for driving the oil pump. In these cases, the belt becomes partially immersed in an oil bath during operation.

Furthermore, it is also possible to use the belt of the present invention in the main transmission for driving cams and also for driving the injection pump in diesel engines.

It has been experimentally verified that the use of the fabric and inserts according to the present invention enables achieving effective oil resistance even at high temperatures and consequently enables passing the endurance tests to which toothed belts are subjected in order to be used in motor vehicles and therefore avoids all the belt problems when used in contact with oil and, in particular, the fall-off in mechanical characteristics, less adhesion, worse meshing and less wear resistance.

Alternatively, the belt according to the present invention can also be used as a dry belt for engine timing.

From examination of the characteristics of the belt produced according to the present invention, the advantages that can be achieved with it are evident.

Advantageously, the above-described belts can consequently be used for both dry and in-oil high-temperature applications, even in the presence of contaminants, for example green fuels, which are particularly aggressive.

What is claimed is:

1. A transmission belt comprising:
   a body including a first elastomeric material in which a plurality of inserts are buried and are arranged in a longitudinal direct and which forms a plurality of teeth that define a working surface of the transmission belt;
   a covering in direct contact with working surface of the transmission belt;
   wherein the covering is a woven fabric, knitted fabric, or non-woven fabric having a weight of between 500 and 1500 g/m$^2$ that comprises filaments made from metallic fibres having a diameter of between 2 and 40 μm or a first yarn of filaments that are made from metallic fibres having a diameter of between 2 and 40 μm, the metallic fibres being at least 25% weight of the yarn.

2. The transmission belt of claim 1, wherein the covering is a woven fabric or a knitted fabric and the weft yarns are the first yarn.

3. The transmission belt of claim 2, wherein the weft yarns are parallel to the inserts.

4. The transmission belt of claim 2, wherein warp yarns are also the first yarn.

5. The transmission belt of claim 2, wherein warp yarns comprise polyamides or polyesters.

6. The transmission belt of claim 5, wherein warp yarns comprise para-aramids or meta-aramids.

7. The transmission belt of claim 1, wherein the metallic fibres are steel fibres.

8. The transmission belt of claim 1, wherein the covering comprises a second yarn which is an elastic yarn as a core around which the first yarn is wound.

9. The transmission belt of claim 8, wherein the covering comprises a third yarn made of para-aromatic polyamide, wherein the first and third yarns as a pair are wound around the second yarn, or the third yarn is wound around the second yarn and the first yarn is subsequently wound around the second third yarn.

10. The transmission belt of claim 1, wherein the covering is treated with at least a first protection treatment and/or a second protection treatment or an adhesion enhancement treatment.

11. The transmission belt of claim 1, wherein the inserts comprise a plurality of yarns and each yarn comprises a plurality of filaments; wherein each filament is made from metallic fibres having a diameter between 10 to 15 μm.

12. The transmission belt of claim 11, wherein the filaments of the inserts comprise a non-metallic fiber wound around each metallic fibre.

13. The transmission belt of claim 12, wherein the non-metallic fibre is selected from the group consisting of glass fibres, aramid fibres, polyester fibres, carbon fibres, and PBO fibres.

14. The transmission belt of claim 12, wherein the non-metallic fibre occupies an area of between 15% and 75% of the overall surface of the metallic fibre.

15. The transmission belt of claim 11, wherein the metallic fibres of the inserts are steel.

16. The transmission belt of claim 11, wherein the plurality of filaments for the inserts is between 50 and 500 filaments.

* * * * *